US006273196B1

(12) United States Patent
Van Vuuren

(10) Patent No.: US 6,273,196 B1
(45) Date of Patent: Aug. 14, 2001

(54) APPARATUS AND METHOD FOR THE STACKING OF CUT GRASS SODS

(75) Inventor: Johannes Van Vuuren, Harmelen (NL)

(73) Assignee: Harmelerwaard Patents B.V., Harmelen (NL)

( * ) Notice: Subject to any disclaimer, the term of this patent is extended or adjusted under 35 U.S.C. 154(b) by 0 days.

(21) Appl. No.: 09/226,286

(22) Filed: Jan. 7, 1999

Related U.S. Application Data

(63) Continuation-in-part of application No. 08/585,632, filed on Jan. 16, 1996, now Pat. No. 5,857,527.

(30) Foreign Application Priority Data

Jul. 12, 1993 (NL) .................................................... 9301218
Jul. 12, 1994 (NL) .................................................... 9400159

(51) Int. Cl.[7] ............................................................ A01B 45/04
(52) U.S. Cl. .............................. 172/20; 414/911; 172/33
(58) Field of Search ................................ 172/19, 20, 33, 172/63, 67, 167, 667, 668, 459; 414/911; 280/486, 492, 411.1

(56) References Cited

U.S. PATENT DOCUMENTS

| Re. 34,827 | 1/1995 | Dover et al. ........................... | 172/19 |
| 3,034,586 | 5/1962 | Ditter ..................................... | 172/19 |

(List continued on next page.)

FOREIGN PATENT DOCUMENTS 0221745   5/1987   (EP) .

*Primary Examiner*—Victor Batson
(74) *Attorney, Agent, or Firm*—Webb Ziesenheim Logsdon Orkin & Hanson, P.C.

(57) ABSTRACT

A sod cutting apparatus includes a cutting head positioned to cut grass sods from grass land and a sod receiving conveyor positioned adjacent the cutting head for receiving the cut grass sods from the cutting head. The sod receiving conveyor has a discharge end which extends away from the cutting head and which is moveable between a first position and a second position. An intermediate conveyor is positioned adjacent the discharge end of the sod receiving conveyor for receiving a first cut grass sod from the discharge end of the sod receiving conveyor in the first position. An offset conveyor is positioned in spaced relation to the intermediate conveyor adjacent the discharge end of the sod receiving conveyor for receiving a second cut grass sod from the sod receiving conveyor in the second position. The intermediate conveyor and the offset conveyor are operable so that the offset conveyor stacks the second cut grass sod on the first cut grass sod. A conveyor head is positioned for receiving from the intermediate conveyor the stacked grass sod. The conveyor head has a discharge end which is moveable over a receiving surface of a sod support. Preferably, during transport of the stacked grass sods toward the receiving surface, the discharge end of the conveyor head and sod support are moved in opposite directions. The conveyor head can also be configured to roll a cut grass sod and to transport the rolled cut grass sod toward the receiving surface of the sod support.

27 Claims, 4 Drawing Sheets

U.S. PATENT DOCUMENTS

| | | | |
|---|---|---|---|
| 3,235,011 | 2/1966 | Pasinki et al. | 172/19 |
| 3,429,377 | 2/1969 | Nunes, Jr. | 172/19 |
| 3,468,381 | 9/1969 | Olson | 172/19 |
| 3,664,432 | 5/1972 | Nunes, Jr. | 172/19 |
| 3,672,452 | 6/1972 | Miner | 172/19 |
| 3,887,013 | 6/1975 | Helberg | 172/20 |
| 4,063,384 | 12/1977 | Warren et al. | 172/20 X |
| 4,162,709 | 7/1979 | Wilson | 172/20 |
| 4,162,726 | 7/1979 | Hudson et al. | 172/20 X |
| 4,294,316 | 10/1981 | Hedley et al. | 172/20 |
| 4,408,666 | 10/1983 | Lawson | 172/19 |
| 4,828,040 | 5/1989 | Schumacher | 172/20 X |
| 4,892,152 | 1/1990 | van Vuuren | 172/20 |
| 4,903,778 * | 2/1990 | Brouwer et al. | 172/19 X |
| 4,944,352 | 7/1990 | Brouwer et al. | 172/19 |
| 5,064,000 | 11/1991 | Dover et al. | 172/19 |
| 5,269,379 * | 12/1993 | Millar et al. | 172/19 |
| 5,775,436 * | 7/1998 | Noyes, II et al. | 172/19 X |
| 5,857,527 * | 1/1999 | Van Vuuren | 172/19 |
| 5,950,407 * | 9/1999 | Rosen | 172/19 X |

\* cited by examiner

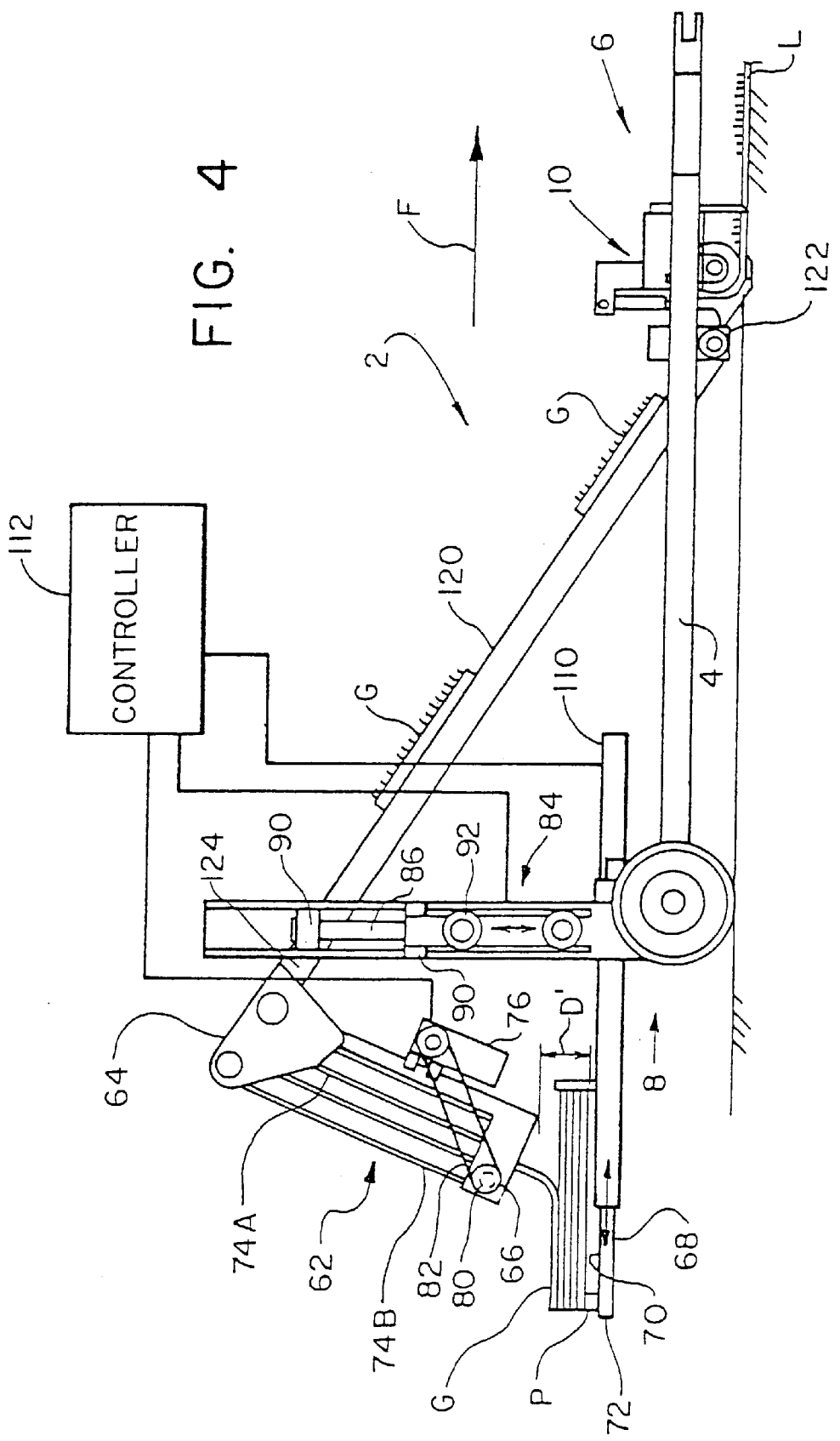

APPARATUS AND METHOD FOR THE STACKING OF CUT GRASS SODS

CROSS REFERENCE TO RELATED APPLICATION

This application is a continuation-in-part of U.S. patent application Ser. No. 08/585,632 filed Jan. 16, 1996, now U.S. Pat. No. 5,857,527.

BACKGROUND OF THE INVENTION

1. Field of the Invention

This invention relates to the stacking of grass sods cut from grass land.

2. Description of the Prior Art

Sod cutters are utilized to cut a grass sod from grass land. The grass sods can be cut into long continuous strips which are rolled or zig-zag stacked on a pallet. Alternatively, the grass sods are cut into short lengths which are stacked on top of each other on the pallet. The stacked or rolled grass sods are utilized to quickly form large grass surface areas, such as those needed for sports fields, golf courses, large lawns and the like.

It is an object of the present invention to provide an apparatus and method for the stacking of grass sods which are utilized to form the large grass surface areas. Still other objects will become apparent to those of ordinary skill in the art upon reading and understanding the following detailed description.

SUMMARY OF THE INVENTION

Accordingly, I have invented a sod cutting apparatus for cutting a grass sod from grass land. The sod cutting apparatus includes a frame having a front end and a back end. A cutting head is connected to the frame adjacent the front end thereof for cutting grass sods from a grass land. A sod receiving conveyor has a receiving end connected to the frame adjacent the cutting head for receiving the grass sods cut from the grass land and a discharge end which extends toward the back end of the frame. The discharge end of the sod receiving conveyor is moveable between a first position and a second position. A positioner is connected between the frame and the discharge end of the sod receiving conveyor for moving the discharge end of the sod receiving conveyor between the first position and the second position. An intermediate conveyor has a receiving end connected to the frame adjacent the discharge end of the sod receiving conveyor for receiving therefrom in the first position a first grass sod and discharge end which extends toward the back end of the frame. An offset conveyor is positioned in spaced relation to the intermediate conveyor adjacent the discharge end of the sod receiving conveyor. The offset conveyor has a receiving end connected to the frame adjacent the discharge end of the sod receiving conveyor for receiving therefrom in the second position a second cut grass sod. The offset conveyor has a discharge end which extends toward the back end of the frame and terminates before the discharge end of the intermediate conveyor. The intermediate conveyor and the offset conveyor are operable so that the offset conveyor stacks the second grass sod on the first grass sod received on the intermediate conveyor.

The sod cutting apparatus can include a conveyor head and a sod support. The sod support is connected to the frame adjacent the back end thereof. The sod support is moveable toward or away from the back end of the frame. The conveyor head has a receiving end pivotally connected adjacent to the discharge end of the intermediate conveyor for receiving therefrom the stacked grass sods. The conveyor head has a discharge end which is moveable toward or away from the back end of the frame over a receiving surface of the sod support for transporting the stacked grass sods toward the receiving surface of the sod support. During conveying of the stacked grass sods toward the receiving surface, the discharge end of the conveyor head and the sod support can be moved in opposite directions.

An elevator can be connected between the conveyor head and the frame for adjusting a distance between the conveyor head and the receiving surface of the sod support. The conveyor head can include a pair of rolling conveyors positioned in spaced relation. The pair of rolling conveyors can be configured to receive therebetween from the discharge end of the intermediate conveyor a cut grass sod, to roll the cut grass sod and to transport the rolled cut grass sod toward the receiving surface of the sod support. A turntable can be rotatably positioned on the sod support.

I have also invented a sod cutting apparatus that includes a frame having a front end and a back end. A cutting head is connected to the frame adjacent the front end thereof for cutting grass sods from grass land. A sod support is connected to the frame adjacent the back end thereof. A pair of rolling conveyors is connected to the frame between the cutting head and the sod support. The pair of rolling conveyors is positioned in spaced relation and is configured to receive therebetween a cut grass sod, to roll the cut grass sod received therebetween and to transport the rolled cut grass sod toward a receiving surface of the sod support.

A sod receiving conveyor can be connected to the frame between the cutting head and the pair of rolling conveyors. The sod receiving conveyor can be positioned to transport cut grass sods from the cutting head toward the pair of rolling conveyors. A positioner can be connected between the frame and end of the sod receiving conveyor opposite the cutting head. The positioner is configured to move the end of the sod receiving conveyor opposite the cutting head between a first position and a second position. An intermediate conveyor is connected to the frame between the sod receiving conveyor and the pair of rolling conveyors. The intermediate conveyor receives from the sod receiving conveyor in the first position a first cut grass sod. An offset conveyor is connected to the frame in spaced relation to the intermediate conveyor. The offset conveyor has one end positioned adjacent the sod receiving conveyor, and another end terminating intermediate the ends of the intermediate conveyor. The offset conveyor is configured to receive from the sod receiving conveyor in the second position a second cut grass sod. The intermediate conveyor and the offset conveyor are operable so that the offset conveyor stacks the second cut grass sod on the first cut grass sod received on the intermediate conveyor.

The pair of rolling conveyors can be operated to receive the stacked grass sods from the intermediate conveyor and to transport the stacked grass sods toward the receiving surface of the sod support. The sod support or the end of the rolling conveyors opposite the intermediate conveyor is moveable toward and/or away from the back end of the frame.

I have also invented a method of stacking grass sods cut from grass land. The method includes cutting a first grass sod from a grass land. The first grass sod is transported to a stacking position. A second grass sod is cut from the grass land and transported toward the stacking position. The second grass sod is stacked on the first grass sod at the stacking position. The stacked first and second grass sods are transported from the stacking position toward a stacking surface. The stacked grass sods and the stacking surface can be moved relative to each other so that the stacked grass sods are gradually received on the stacking surface.

Moreover, I have invented a method of rolling and stacking grass sods cut from grass land. The method includes cutting a grass sod from a grass land. The cut grass sod is transported away from the grass land and thereafter transported toward the grass land. During transport of the grass sod toward the grass land, the cut grass sod is rolled and the rolled cut grass sod is positioned on a stacking surface. Another cut grass sod can be cut from the grass land, transported away from the grass land and thereafter transported toward the grass land. During transport toward the grass land, the other cut grass sod can be rolled and positioned on the stacking surface adjacent the rolled cut grass sod.

I have also invented a sod cutter for cutting grass sods from a grass land. The sod cutter includes a frame having a front end, a back end and a cutting head connected to the frame adjacent the front end thereof for cutting grass sods from a grass land. A sod support is moveably connected to the frame adjacent the back end thereof. A conveyor head is connected to the frame. The conveyor head has a receiving end and a discharge end. The discharge end of the conveyor is positioned over the sod support. The conveyor head is configured to transport to the sod support cut grass sods received at the receiving end thereof. A conveyor is positioned to receive cut grass sods from the cutting head and to transport the cut grass sods received thereon toward the receiving end of the conveyor head. At least one of the sod support and the conveyor head move relative to the other of the sod support and the conveyor head when the conveyor head transports cut grass sods to the sod support.

BRIEF DESCRIPTION OF THE DRAWINGS

FIG. 4 shows a side view of another sod cutting apparatus in accordance with the present invention.

DETAILED DESCRIPTION OF THE PREFERRED EMBODIMENTS

For simplicity of illustration and description, like elements in FIGS. 1–4 have the same reference numbers.

Figure 1:
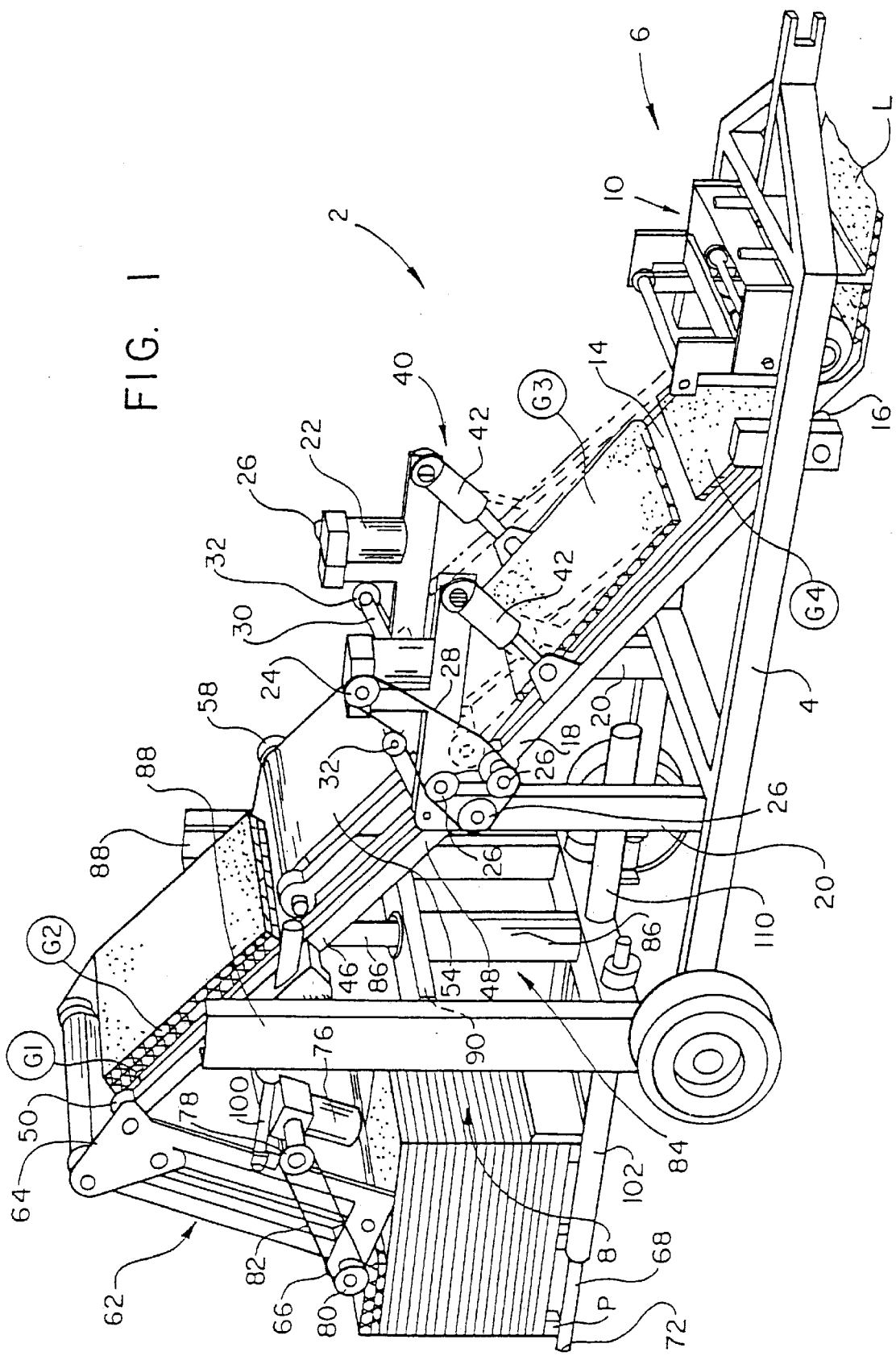
FIG. 1 shows a perspective view of a sod cutting apparatus in accordance with the present invention.

With reference to FIG. 1, a sod cutter 2 includes a frame 4 having a front end 6 and a back end 8. A cutting head 10 is attached to the frame 4 adjacent the front end 6 for cutting grass sods G from a grass land L. Details of a cutting head suitable for cutting out grass sods G from a grass land L is described in U.S. Pat. No. 4,892,151 which is incorporated herein by reference.

A sod receiving conveyor 14 has a receiving end 16 and a discharge end 18. The receiving end 16 of the sod receiving conveyor 14 is attached to the frame 4 adjacent the cutting head 10 for receiving from the cutting head 10 the grass sods G cut from the grass land L. The discharge end 18 of the sod receiving conveyor 14 extends away from the grass land L and toward the back end 8 of the frame 4.

The frame 4 includes a pair of support arms 20 positioned on opposite sides of the discharge end 18 of the sod receiving conveyor 14. The end of each support arm 20 opposite the grass land L preferably includes a motor 22 having a motor pulley 24 coupled to a plurality of drive pulleys 26 by a flexible continuous belt 28. Each support arm 20 includes a tensioner 30 which has a tension wheel 32 which is biased into contact with the flexible continuous belt 28 so that the flexible continuous belt 28 remains taut or tensioned against the motor pulley 24 and the plurality of drive pulleys 26.

Figure 2:
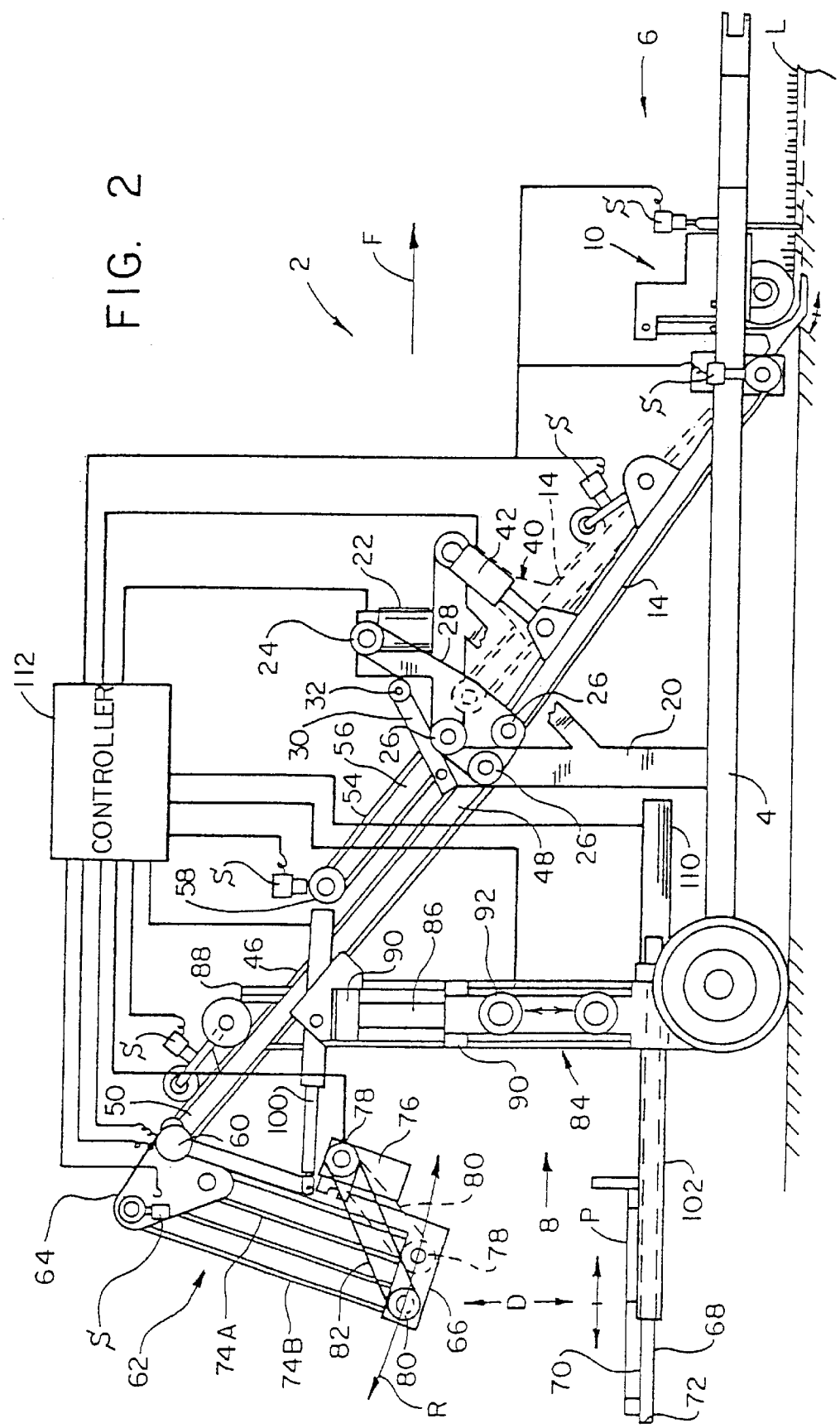
FIG. 2 shows a side view of the sod cutting apparatus of FIG. 1 including a controller.

With reference to FIG. 2, and with ongoing reference to FIG. 1, a positioner 40 is connected between the pair of support arms 20 and the sod receiving conveyor 14 adjacent the discharge end 18 thereof. The positioner 40 includes a pair of hydraulic presses 42 configured to adjust the discharge end 18 of the sod receiving conveyor 14 between a first, lower position and a second, upper position (shown in phantom in FIGS. 1 and 2). As shown best in FIG. 2, the tensioner 30 and the tension wheel 32 coact with the flexible continuous belt 28 to maintain the flexible continuous belt 28 tensioned against the motor pulley 24 and the plurality of drive pulleys 26 when the discharge end 18 of the sod receiving conveyor 14 is in the first position or the second position.

The sod cutter 2 includes an intermediate conveyor 46 which has a receiving end 48 attached between the support arms 20 adjacent the discharge end 18 of the sod receiving conveyor 14. The intermediate conveyor 46 has a discharge end 50 which extends away from the grass land L and toward the back end 8 of the frame 4.

An offset conveyor 54 is attached between the pair of support arms 20 and positioned in spaced relation to the intermediate conveyor 46 adjacent the discharge end 18 of the sod receiving conveyor 14. The offset conveyor 54 has a receiving end 56 positioned adjacent the discharge end 18 of the sod receiving conveyor 14 and a discharge end 58 which extends away from the grass land L and toward the back end 8 of the frame 4 and terminates before the discharge end 50 of the intermediate conveyor 46.

The discharge end 18 of the sod receiving conveyor 14, the receiving end 48 of the intermediate conveyor 46 and the receiving end 56 of the offset conveyor 54 are coupled to the motors 22 by the motor pulleys 24, the drive pulleys 26 and the flexible continuous belts 28. A brake 60 is coupled to a roller (not shown) of the intermediate conveyor 46 at the discharge end 50 thereof. The brake 60 can be operated to stop the intermediate conveyor 46 while enabling the motors 22 to supply motive force to the sod receiving conveyor 14 and the offset conveyor 54 via the drive pulleys 26 and the flexible continuous belts 28.

A conveyor head 62 has a receiving end 64 pivotally connected to the intermediate conveyor 46 adjacent the discharge end 50 thereof. The conveyor head 62 has a discharge end 66 which extends toward a sod support 68 attached to the frame 4 adjacent the back end 8 of the frame 4 between the conveyor head 62 and the grass land L. The sod support 68 has a receiving surface 70 configured to receive a pallet P which receives cut grass sods from the discharge end 66 of the conveyor head 62. The sod support 68 has a distal end 72 positioned away from the back end 8 of the frame 4. The conveyor head 62 includes a pair of rolling conveyors 74A and 74B positioned in spaced relation. Each rolling conveyor 74A and 74B is coupled to a motor 76 by a motor pulley 78, a drive pulley 80 and a flexible continuous belt 82.

An elevator 84 is connected between the back end 8 of the frame 4 and the conveyor head 62. The elevator 84 is configured to adjust a distance between the discharge end 50 of the intermediate conveyor 46 and the receiving surface 70 of the sod support 68 and, hence, a distance D between the discharge end 66 of the conveyor head 62 and the receiving surface 70 of the sod support 68. More specifically, the elevator 84 includes a hydraulic lift 86 having one end connected adjacent the back end 8 of the frame 4 and an opposite end connected to the intermediate conveyor 46 adjacent the discharge end 50 thereof. The hydraulic lift 86 is positioned between a pair of guide rails 88 which are positioned on opposite sides of the back end 8 of the frame 4. A pair of lateral supports 90 is connected to the hydraulic lift 86 in spaced parallel relation and extends between the pair of guide rails 88. The ends of each lateral support 90 can include guide wheels 92 which are received in the guide rails 88.

The hydraulic lift 86 can be operated to adjust the discharge end 50 of the intermediate conveyor 46 closer to or further away from the receiving surface 70 of the sod support 68, thus adjusting the distance D between the discharge end 66 of the conveyor head 62 and the receiving surface 70 of the sod support 68. A hydraulic press 100 is connected between one of the guide rails 88 adjacent the intermediate conveyor 46 and the conveyor head 62 intermediate the receiving end 64 and the discharge end 66 thereof. The hydraulic press 100 can be operated to pivot the conveyor head 62 about the receiving end 64 so that the discharge end 66 of the conveyor head 62 moves in an arc R toward or away from the back end 8 of the frame 4 and, more specifically, the elevator 84.

Figure 3:
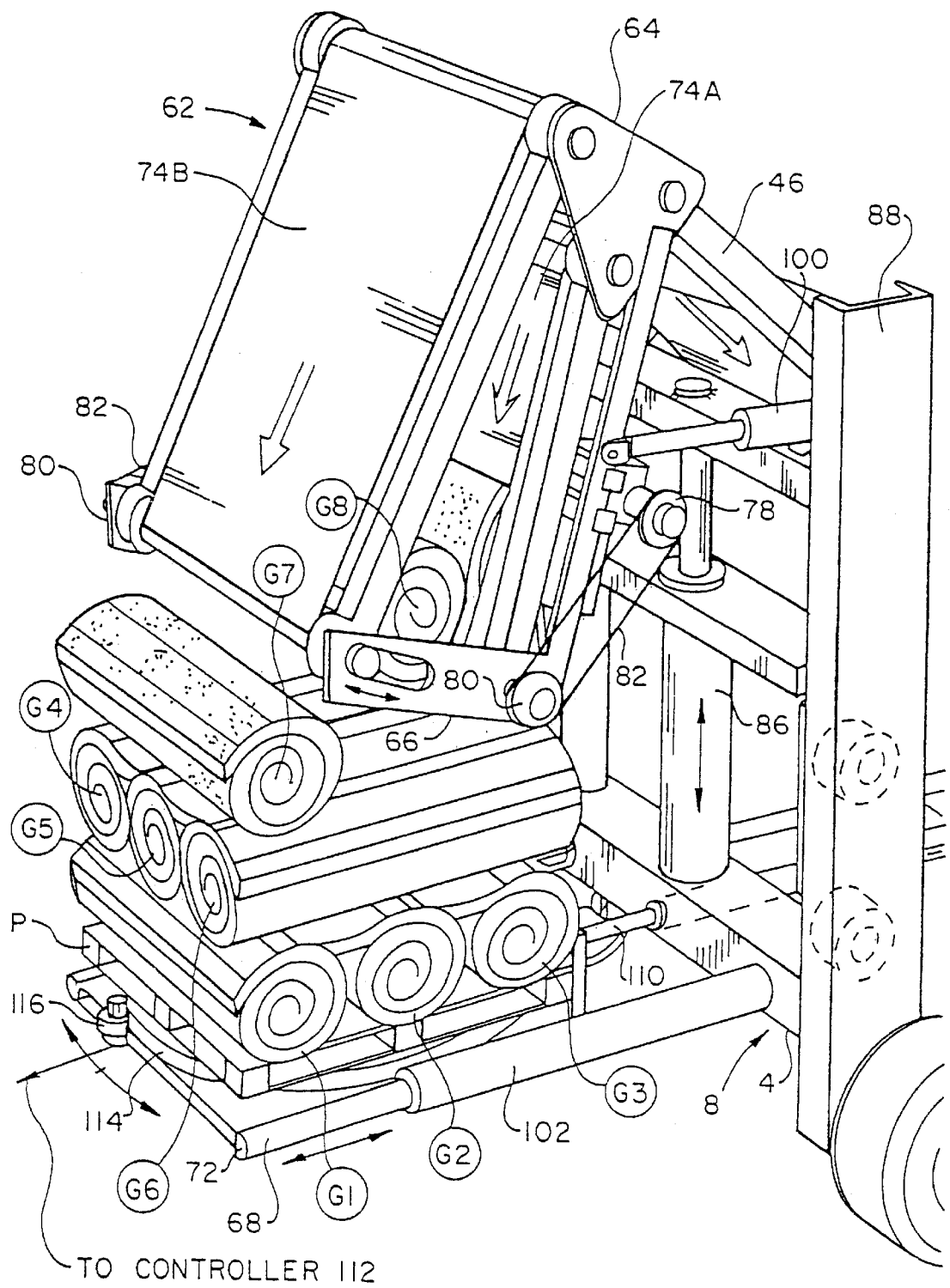
FIG. 3 shows a close-up perspective view of a back end of a sod cutting apparatus in accordance with the present invention.

Opposite sides of the sod support 68 are received in guide rails 102 which are coupled to and extend away from the back end 8 of the frame 4. A hydraulic press 110, shown best in FIGS. 2 and 3, is coupled between the back end 8 of the frame 4 and a side of the sod support 68 adjacent thereto. The hydraulic press 110 can be operated to move the sod support toward and away from the back end 8 of the frame 4.

A controller 112, shown schematically in FIG. 2, is connected to the motors 22 and 76, the hydraulic presses 42, 100 and 110 and the hydraulic lift 86. The controller 112 synchronizes the operation of the motors 24 and 76, the hydraulic presses 42, 100 and 110 and the hydraulic lift 86. The controller 112 is also connected to a plurality of sensors S that provide to the controller 112 signals indicative of a condition, such as position or linear displacement, detected thereby.

In operation, the sod cutter 2 is pulled by the front end 6 of the frame 4 in a direction F by a puller (not shown). In response to moving in the direction F, the cutting head 10 cuts from the grass land L a first grass sod G1. The controller 112 causes the hydraulic press 42 to position the sod receiving conveyor 14 in the first, lower position. The controller 112 causes the motors 22 to supply motive force to the motor pulleys 24 which cause the flexible continuous belts 28 to drive the drive pulleys 26. The first grass sod G1 is received at the receiving end 16 of the sod receiving conveyor 14 which transports the first grass sod G1 to the discharge end 18 of the sod receiving conveyor 14. In the first, lower position, the discharge end 18 of the sod receiving conveyor 14 delivers the first grass sod G1 to the receiving end 48 of the intermediate conveyor 46. The intermediate conveyor 46 transports the first grass sod G1 toward the discharge end 50 of the intermediate conveyor 46. When the first grass sod G1 is between the discharge end 50 of the intermediate conveyor 46 and the discharge end 58 of the offset conveyor 54, i.e., a stacking position, the controller 112 causes the brake 60 to activate thereby stopping the intermediate conveyor 46.

When the first grass sod G1 is received on the intermediate conveyor 46, the controller 112 causes the hydraulic press 42 to adjust the sod receiving conveyor 14 to the second, upper position, shown in phantom in FIGS. 1 and 2, ongoing movement of the sod cutter 2 in the direction F causes the cutting head 10 to cut from the grass land L a second grass sod G2 which is delivered to the receiving end 16 of the sod receiving conveyor 14. The sod receiving conveyor 14 transports the second grass sod G2 from the receiving end 16 to the discharge end 18 of the sod receiving conveyor 14. In the second, upper position, the sod receiving conveyor 14 delivers the second grass sod G2 from the discharge end 18 to the receiving end 56 of the offset conveyor 54. The offset conveyor 54 transports the second grass sod G2 to the discharge end 58 of the offset conveyor 54 and onto the first grass sod G1 so that the second grass sod G2 is stacked on the first grass sod G1. When the first and second grass sods G1 and G2 are stacked, the controller 112 causes the brake 60 to release thereby enabling the stacked first and second grass sods G1 and G2 to be delivered from the discharge end 50 of the intermediate conveyor 46 to the receiving end 64 of the conveyor head 62.

The controller 112 causes the motors 76 to operate and supply motive force to the motor pulleys 78, the drive pulleys 80 and the flexible continuous belts 82 so that the surfaces of the rolling conveyors 74A and 74B positioned in opposition move in a direction from the receiving end 64 of the conveyor head 62 to the discharge end 66 of the conveyor head 62. The conveyor head 62 receives the stacked first and second grass sods G1 and G2 between the rolling conveyors 74A and 74B which transport the stacked first and second grass sods G1 and G2 toward the receiving surface 70 of the sod support 68.

To ensure uniform stacking and to avoid damaging the cut grass sods during stacking, the controller 112 adjusts the hydraulic lift 86 so that the discharge end 66 of the conveyor head 62 is adjacent a top surface of the pallet P received on the receiving surface 70 of the sod support 68. During stacking of the stacked cut grass sods G1 and G2, the discharge end 66 of the conveyor head 62 is moved toward or away from the back end 8 of the frame 4 and/or the sod support 68 is moved toward or away from the back end 8 of the frame 4. More specifically, prior to stacking the stacked cut grass sods G1 and G2, the controller 112 causes the hydraulic press 100 to position the discharge end 66 of the conveyor head 62 away from the back end 8 of the frame 4 and causes the hydraulic press 110 to position the sod support 68 adjacent the back end 8 of the frame 4. Preferably, the discharge end 66 of the conveyor head 62 is positioned above the distal end 72 of the sod support 68. When the conveyor head 62 delivers the stacked grass sods G1 and G2 toward the top surface of the pallet P, the controller 112 preferably causes the hydraulic press 100 to move the discharge end 66 of the conveyor head 62 toward the back end 8 of the frame 4 and, simultaneously, causes the hydraulic press 110 to move the sod support 68 away from the back end 8 of the frame 4. Moving the discharge end 66 of the conveyor head 62 and the sod support 68 in opposite directions enables the stacked grass sods G1 and G2 to be gradually received on the top or stacking surface of the pallet P.

When the stacked grass sods G1 and G2 are received on the top surface of the pallet P, the controller 112 causes the hydraulic lift 86 to adjust the distance D, and causes the hydraulic presses 100 and 110 to position the conveyor head 62 and the sod support 68, respectively, so that another pair of stacked grass sods, e.g., G3 and G4, can be stacked on the stacked grass sods G1 and G2. More specifically, the controller 112 causes the hydraulic lift 86 to adjust and increase the distance D between the discharge end 66 of the conveyor head 62 and the receiving surface 70 of the sod support 68 and causes the hydraulic presses 100 and 110 to position the discharge end 66 of the conveyor head 62 above the top surface of the pallet P adjacent the distal end 72 of the sod support 68. When the conveyor head 62 transports the stacked grass sods G3 and G4 toward the top surface of the pallet P, the controller 112 causes the hydraulic press 100 to move the discharge end 66 of the conveyor head 62 toward the back end 8 of the frame 4, and causes the hydraulic press 110 to move the sod support 68 away from the back end 8 of the frame 4 thereby enabling the stacked grass sods G3 and G4 to be gradually received on the stacked grass sods G1 and G2.

As can be seen, the controller 112 synchronizes the operations of the conveyors 14, 46, 54, brake 60 and hydraulic presses 42 to stack grass sods at the stacking position adjacent the discharge end 50 of the intermediate conveyor 46. Moreover, the controller 112 synchronizes the operations of the conveyor head 62, the hydraulic lift 86 and the hydraulic presses 100 and 110 to transport and stack the stacked grass sods on a pallet P positioned on the receiving surface 70 of the sod support 68.

Preferably, the controller 112 operates the hydraulic press 100 and the hydraulic press 110 to move the discharge end 66 of the conveyor head 62 toward the back end 8 of the frame 4 and, simultaneously, to move the sod support 68 away from the back end 8 of the frame 4, or vice versa, when the conveyor head 62 delivers the stacked grass sods toward the top surface of the pallet P. However, the controller 112 can operate the hydraulic press 100 and the hydraulic press 110 so that the discharge end 66 of the conveyor head 62 remains stationery and the sod support 68 moves toward or away from the back end 8 of the frame 4 when the conveyor head 62 delivers the stacked grass sods toward the top surface of the pallet P. Moreover, the controller 112 can operate the hydraulic press 100 and the hydraulic press 110 so that the sod support 68 is stationery and the discharge end 66 of the conveyor head 62 moves toward or away from the back end 8 of the frame 4 when the conveyor head 62 delivers the stacked grass sods toward the top surface of pallet B.

With reference to FIG. 3, and with ongoing reference to all previous figures, the rolling conveyors 74A and 74B can be configured to roll cut grass sods G received from the intermediate conveyor 46. More specifically, the rolling conveyor 74A is fixedly positioned between the receiving end 64 of the conveyor head 62 and the discharge end 66 of the conveyor head 62. In contrast, the rolling conveyor 74B has one end pivotally connected adjacent the receiving end 64 of the conveyor head 62. The end of the rolling conveyor 74B adjacent the discharge end 66 of the conveyor head 62 is moveable in an arc toward and away from the back end 8 of the frame 4. As discussed above, the receiving end 64 of the conveyor head 62 is pivotally connected adjacent the discharge end 50 of the intermediate conveyor 46.

In operation, the controller 112 causes the motors 76 to supply to the motor pulleys 78, the drive pulleys 80 and the flexible continuous belts 82 motive forces that cause the surfaces of the rolling conveyors 74A and 74B positioned in opposition to move in opposite directions. When a cut grass sod G is received between the rolling conveyors 74A and 74B from the intermediate conveyor 46, the rolling conveyors 74A and 74B coact to roll the cut grass sod G therebetween as the cut grass sod G is transported from the receiving end 64 of the conveyor head 62 to the discharge end 66 of the conveyor head 62.

When the cut grass sod G is rolled between the rolling conveyors 74A and 74B, the spacing between the rolling conveyor 74A and the end of the rolling conveyor 74B adjacent the discharge end 66 of the conveyor head 62 increases with increasing diameter of the grass sod G being rolled between the rolling conveyors 74A and 74B. More specifically, the rolling conveyor 74B pivots around its end adjacent the receiving end 64 of the conveyor head 62 so that the end of the rolling conveyor 74B adjacent the discharge end 66 of the conveyor head 62 moves away from the rolling conveyor 74A. When the rolled grass sod G exits the discharge end 66 of the conveyor head 62, gravity causes the rolling conveyor 74B to pivot around its end adjacent the receiving end 64 of the conveyor head 62 so that the end of the rolling conveyor 74B adjacent the discharge end 66 of the conveyor head 62 moves toward the rolling conveyor 74A.

To enable one of the motors 76 to supply motive force to the rolling conveyor 74B, while it is moving toward and away from the rolling conveyor 74A, a tensioner (not shown) biases the flexible continuous belt 82 in tension with the drive pulley 80 and the motor pulley 78 of the one of the motors 76 which supplies motive force to the rolling conveyor 74B.

The controller 112 synchronizes the operation of the hydraulic lift 86 and the hydraulic presses 100 and 110 to stack each rolled grass sod G on the pallet P. Preferably, each rolled grass sod G is stacked adjacent another rolled grass sod G in a layer of rolled grass sods, e.g., G1–G3, on the pallet P.

To enable alternating layers of rolled grass sods G to be cross stacked on the pallet P, the sod support 68 includes a turntable 114 rotatably positioned on the receiving surface 70 of the sod support 68 and configured to receive the pallet P on a surface thereof opposite the receiving surface 70 of the sod support 68. A turntable motor 116 is connected to the controller 112 and is coupled between the sod support 68 and the turntable 114 for rotating the turntable 114 relative to the sod support 68 and around an axis normal to the receiving surface 70 of the sod support 68.

In operation, the controller 112 synchronizes the operation of the intermediate conveyor 46, the conveyor head 62, the hydraulic lift 86, the hydraulic presses 100 and 110 and the turntable motor 116 to stack a first layer of rolled grass sods G1–G3 on the pallet P. When the first layer of rolled grass sods G1–G3 is stacked on the pallet P, the controller 112 causes the turntable motor 116 to rotate the turntable 114 by 90°. The controller 112 then causes a second layer of rolled grass sods G4–G6 to be stacked at right angles to the first layer of rolled grass sods G1–G3. When the second layer of rolled grass sods G4–G6 is stacked, the controller 112 causes the turntable motor 116 to rotate the turntable 114 by 90° so that a third layer of rolled grass sods is stacked on the second layer of rolled grass sods G4–G6 at a right angle thereto.

As can be seen, the rolling conveyors 74A and 74B can be configured to transport stacked grass sods G toward the pallet P received on the receiving surface 70 of the sod support 68. Moreover, the rolling conveyors 74A and 74B can be configured to roll a grass sod G and to transport the rolled grass sod G toward the pallet P received on the turntable 114 which is positioned on the sod support 68.

With reference to FIG. 4, in another embodiment, the sod receiving conveyor 14, the intermediate conveyor 46 and the offset conveyor 54 of FIGS. 1 and 2 are omitted and replaced with a sod receiving conveyor 120 which has a receiving end 122 and a discharge end 124. The receiving end 122 of the sod receiving conveyor 120 is attached to the frame 4 adjacent the cutting head 10 for receiving from the cutting head 10 the grass sods G cut from the grass land L. The discharge end 124 of the sod receiving conveyor 120 extends away from the grass land L toward the back end 8 of the frame 4 adjacent the receiving end 64 of the conveyor head 62. Preferably, the conveyor head 62 is fixedly connected to the discharge end 124 of the sod receiving conveyor 120. For simplicity of illustration, motors, motor pulleys and drive pulleys utilized to drive the sod receiving conveyor 120 have been omitted from FIG. 4.

The elevator 84 is connected between the back end 8 of the frame 4 and the conveyor head 62. The elevator 84 is configured to adjust the distance between the discharge end 124 of the sod receiving conveyor 120 and the receiving surface 70 of the sod support 68 and, hence, a distance D' between the discharge end 64 of the conveyor head 62 and the receiving surface 70 of the sod support 68.

In operation, the sod cutter 2 is pulled by the front end 6 of the frame 4 in a direction F by a puller (not shown). In response to moving in the direction F, the cutting head 10 cuts grass sods G from the grass land L. Each grass sod G is received at the receiving end 122 of the sod receiving conveyor 120 which transports each grass sod G to the discharge end 124 of the sod receiving conveyor 120. The sod receiving conveyor 120 delivers each grass sod G from the discharge end 124 thereof to the receiving end 64 of the conveyor head 62.

The controller causes the motors 76 to operate and supply motive force to the motor pulleys 78, the drive pulleys 80 and the flexible continuous belts 82 so that the surfaces of the rolling conveyors 74A and 74B positioned in opposition move in a direction from the receiving end 64 of the conveyor head 62 to the discharge end 66 of the conveyor head 62. The conveyor head 62 receives each grass sod G between the rolling conveyors 74A and 74B which transport each grass sod G toward the receiving surface 70 of the sod support 68.

To ensure uniform stacking and to avoid damaging the grass sods G during stacking, the controller 112 adjusts the hydraulic lift 86 so that the discharge end 66 of the conveyor head 62 is adjacent the top surface of the pallet P received on the receiving surface 70 of the sod support 68. During stacking of each grass sod G, the sod support 68 is moved toward or away from the back end 8 of the frame 4. More specifically, prior to stacking each grass sod G, the controller 112 causes the hydraulic press 110 to position the sod support 68 adjacent the back end 8 of the frame 4. When the conveyor head 62 delivers each grass sod G toward the top surface of the pallet P, the controller 112 causes the hydraulic press 110 to move the sod support 68 away from the back end 8 of the frame 4 thereby enabling each grass sod G to be gradually received on the top surface of the pallet P or on grass sods G previously received on the pallet P.

When each grass sod G is received on the top surface of the pallet P or on one or more grass sods G previously received on the pallet P, the controller 112 causes the hydraulic lift 86 to adjust the distance D' and causes the hydraulic press 110 to position the sod support 68 so that another grass sod G can be stacked on the grass sod G previously received on the pallet P. More specifically, the controller 112 causes the hydraulic lift 86 to adjust and increase the distance D' between the discharge end 66 of the conveyor head 62 and the receiving surface 70 of the sod support 68 and causes the hydraulic press 110 to position the sod support 68 adjacent the back end 8 of the frame 4. Preferably, operation of the hydraulic press 110 and the hydraulic lift 86 causes the sod support 68 and the discharge end 124 of the sod receiving conveyor 120, respectively, to move transverse to each other.

When the conveyor head 62 transports another grass sod G toward the top surface of the pallet P, the controller 112 causes the hydraulic press 110 to move the sod support 68 away from the back end 8 of the frame 4 thereby enabling the other grass sod G to be gradually received on the grass sod G previously received on the pallet P.

As can be seen, the controller 112 synchronizes the operation of the conveyor head 62, the hydraulic lift 86 and the hydraulic press 110 to transport and stack grass sods G on the pallet P positioned on the receiving surface 70 of the sod support 68.

The invention has been described with reference to the preferred embodiment. Obvious modifications and alterations will occur to others upon reading and understanding the preceding detailed description. For example, one or more clutches (not shown) can be connected to the controller and coupled between the intermediate conveyor 46 and the drive pulleys 26 utilized to drive the intermediate conveyor 46. When stacking grass sods G at the stacking position, the controller 112 can cause the one or more clutches to disengage the intermediate conveyor 46 from the drive pulleys 26 utilized to drive the intermediate conveyor 46 so that no motive force can be supplied to the intermediate conveyor 46 from the motors 22. Similarly, when the intermediate conveyor 46 is utilized to transport grass sods G, the controller 112 causes the one or more clutches to engage and couple the intermediate conveyor 46 and the corresponding drive wheels 26 so that motive force can be supplied to the intermediate conveyor 46 from the motors 22. The one or more clutches and the brake 60 can be utilized separately or together to control the movement of the intermediate conveyor 46. It is intended that the invention be construed as including all such modifications and alterations insofar as they come within the scope of the appended claims or the equivalents thereof.

I claim:

1. A sod cutting apparatus for cutting grass sods from a grass land, the sod cutting apparatus comprising:

a frame having a front end and a back end;

a cutting head connected to the frame adjacent the front end thereof for cutting grass sods from a grass land;

a sod receiving conveyor having a receiving end connected to the frame adjacent the cutting head for receiving the grass sods cut from the grass land and a discharge end which extends toward the back end of the frame, with the discharge end of the sod receiving conveyor moveable between a first position and a second position;

a positioner connected between the frame and the discharge end of the sod receiving conveyor for moving the discharge end of the sod receiving conveyor between the first position and the second position;

an intermediate conveyor having a receiving end connected to the frame adjacent the discharge end of the sod receiving conveyor for receiving from the discharge end of the sod receiving conveyor in the first position a first grass sod and a discharge end which extends toward the back end of the frame; and an offset conveyor positioned in spaced relation to the intermediate conveyor adjacent the discharge end of the sod receiving conveyor, with the offset conveyor having a receiving end connected to the frame adjacent the discharge end of the sod receiving conveyor for receiving from the discharge end of the sod receiving conveyor in the second position a second cut grass sod and a discharge end which extends toward the back end of the frame and which terminates before the discharge end of the intermediate conveyor, with the intermediate conveyor and the offset conveyor operable so that the offset conveyor stacks the second grass sod on the first grass sod received on the intermediate conveyor.

2. The sod cutting apparatus as set forth in claim 1, further comprising:

a sod support connected to the frame adjacent the back end thereof with the sod support moveable at least one of toward the back end of the frame and away from the back end of the frame, with the sod support having a receiving surface; and a conveyor head for transporting the stacked grass sods toward the receiving surface of the sod support, with the conveyor head having a receiving end pivotally connected adjacent the discharge end of the intermediate conveyor for receiving therefrom the stacked grass sods and a discharge end moveable over the receiving surface of the sod support at least one of the toward the back end of the frame and away from the back end of the frame.

3. The sod cutting apparatus as set forth in claim 2, wherein during transport of the stacked grass sods toward the receiving surface, the discharge end of the conveyor head and the sod support move in opposite directions.

4. The sod cutting apparatus as set forth in claim 1, further comprising:

a sod support connected to the frame adjacent the back end thereof, with the sod support having a receiving surface; and a conveyor head for transporting the stacked grass sods toward the receiving surface of the sod support, with the conveyor head having a receiving end connected adjacent the discharge end of the intermediate conveyor for receiving therefrom the stacked grass sods and a discharge end moveable over the receiving surface of the sod support.

5. The sod cutting apparatus as set forth in claim 1, further comprising:

a sod support connected to the frame adjacent the back end thereof, with the sod support moveable at least one of toward the back end of the frame and away from the back end of the frame, with the sod support having a receiving surface; and a conveyor head having a receiving end connected adjacent the discharge end of the intermediate conveyor for receiving therefrom the stacked grass sods and a discharge end positioned for transporting the stacked grass sods toward the receiving surface of the sod support.

6. The sod cutting apparatus as set forth in claim 1, further comprising:

a sod support connected to the frame adjacent the back end thereof, with the sod support having a receiving surface; and a conveyor head having a receiving end connected to the intermediate conveyor adjacent the discharge end thereof for receiving therefrom the stacked grass sods and a discharge end positioned for transporting the stacked grass sods toward the receiving surface of the sod support.

7. The sod cutting apparatus as set forth in claim 6, further including an elevator connected between the conveyor head and the frame, with the elevator configured to adjust a distance between the conveyor head and the receiving surface of the sod support.

8. The sod cutting apparatus as set forth in claim 6, wherein the conveyor head includes a pair of rolling conveyors positioned in spaced relation, with the pair of rolling conveyors configured to receive therebetween from the discharge end of the intermediate conveyor a cut grass sod, to roll the cut grass sod and to transport the rolled cut grass sod toward the receiving surface of the sod support.

9. The sod cutting apparatus as set forth in claim 8, further including a turntable rotatably positioned on the receiving surface of the sod support.

10. A sod cutting apparatus for cutting grass sods from a grass land, the sod cutting apparatus comprising:

a frame having a front end and a back end;

a cutting head connected to the frame adjacent the front end thereof for cutting grass sods from grass land;

a sod support connected to the frame adjacent the back end thereof, with the sod support having a receiving surface; and a pair of rolling conveyors connected to the frame between the cutting head and the sod support, with the pair of rolling conveyors positioned in spaced relation and configured to receive therebetween a cut grass sod, and to urge the cut grass sod toward the receiving surface of the sod support.

11. The sod cutting apparatus as set forth in claim 10, further including an elevator positioned between the frame and the pair of rolling conveyors, with the elevator configured to adjust a distance between the pair of rolling conveyors and the receiving surface of the sod support.

12. The sod cutting apparatus as set forth in claim 10, further including:

a sod receiving conveyor connected to the frame between the cutting head and the pair of rolling conveyors, with the sod receiving conveyor positioned for transporting cut grass sods from the cutting head toward the pair of rolling conveyors;

a positioner connected between the frame and an end of the sod receiving conveyor opposite the cutting head, with the positioner configured to position the end of the sod receiving conveyor at one of a first position and a second position;

an intermediate conveyor connected to the frame between the sod receiving conveyor and the pair of rolling conveyors, with the intermediate conveyor receiving from the sod receiving conveyor in the first position a first cut grass sod; and an offset conveyor connected to the frame in spaced relation to the intermediate conveyor, with the offset conveyor having one end positioned adjacent the sod receiving conveyor and having another end terminating intermediate opposite ends of the intermediate conveyor, with the offset conveyor receiving from the sod receiving conveyor in the second position a second cut grass sod, with the intermediate conveyor and the offset conveyor operable so that the offset conveyor stacks the second grass sod on the first grass sod received on the intermediate conveyor.

13. The sod cutting apparatus as set forth in claim 12, wherein the pair of rolling conveyors is operable to receive from the intermediate conveyor the second grass sod stacked on the first grass sod and to transport the second grass sod stacked on the first grass sod toward the receiving surface of the sod support.

14. The sod cutting apparatus as set forth in claim 13, wherein during transport of the stacked grass sods toward the receiving surface, the sod support and the end of the pair of rolling conveyors adjacent thereto move in opposite directions.

15. The sod cutting apparatus as set forth in claim 10, wherein at least one of the sod support and an end of the pair of rolling conveyors adjacent the sod support is moveable at least one of toward the back end of the frame and away from the back end of the frame.

16. The sod cutting apparatus as set forth in claim 10, wherein the pair of rolling conveyors is configured to roll the cut grass sod received therebetween during transport of the grass sod toward the receiving surface of the sod support.

17. A method of stacking grass sods cut from grass land, the method comprising the steps of:
   (a) cutting from a grass land a first grass sod;
   (b) transporting the first grass sod to a stacking position;
   (c) cutting from the grass land a second grass sod;
   (d) transporting the second grass sod toward the stacking position;
   (e) stacking the second grass sod on the first grass sod at the stacking position; and
   (f) transporting the stacked first and second grass sods from the stacking position toward a stacking surface.

18. The method as set forth in claim 17, further including the step of, during transport of the stacked first and second grass sods from the stacking position toward the stacking surface, moving the stacked first and second grass sods and the stacking surface relative to each other so the stacked first and second grass sods are gradually received on the stacking surface.

19. A method of rolling and a stacking grass sods cut from grass land, the method comprising the steps of:
   (a) cutting from a grass land a grass sod;
   (b) transporting the cut grass sod away from the grass land;
   (c) transporting the cut grass sod toward the grass land;
   (d) during transport of the cut grass sod toward the grass land, rolling the cut grass sod; and
   (e) positioning the rolled cut grass sod on a stacking surface.

20. The method as set forth in claim 19, further including the steps of:
   (f) cutting from a grass land another grass sod;
   (g) transporting the other cut grass sod away from the grass land;
   (h) transporting the other cut grass sod toward the grass land;
   (i) rolling the other cut grass sod during transport of the other cut grass sod toward the grass land; and
   (j) positioning the rolled other cut grass sod on the stacking surface adjacent the rolled cut grass sod.

21. The method as set forth in claim 20, further including at least one of the steps of:
   moving the stacking surface in a direction parallel thereto; and
   rotating the stacking surface around an axis normal thereto.

22. A sod cutter for cutting grass sods from a grass land, the sod cutter comprising:
   a frame having a front end and a back end;
   a cutting head connected to the frame adjacent the front end thereof for cutting grass sods from a grass land;
   a sod support moveably connected to the frame adjacent the back end thereof;
   a conveyor head connected to the frame, with the conveyor head having a receiving end and a discharge end, with the discharge end of the conveyor head positioned over the sod support, with the conveyor head configured to urge to the sod support cut grass sods received at the receiving end thereof; and
   a conveyor positioned to receive cut grass sods from the cutting head and to transport the cut grass sods received thereon toward the receiving end of the conveyor head, wherein at least one of the sod support and the conveyor head moves relative to the other of the sod support and the conveyor head when the conveyor head transports cut grass sods to the sod support.

23. The sod cutter as set forth in claim 22, wherein:
   the receiving end of the conveyor head is pivotally connected to the frame;
   the discharge end of the conveyor head is pivotal around the receiving end thereof so that the discharge end of the conveyor head is moveable over the sod support; and
   the sod support and the discharge end of the conveyor head move in opposite directions when the conveyor head transports cut grass sods to the sod support.

24. The sod cutter as set forth in claim 22, wherein when the conveyor head transports cut grass sods to the sod support one of:
   (i) the discharge end of the conveyor head is stationary and the sod support is moveable relative to the discharge end of the conveyor head;
   (ii) the sod support is stationary and the discharge end of the conveyor head is moveable relative to the sod support; and
   (iii) the discharge end of the conveyor head and the sod support are moveable in opposite directions.

25. A sod cutter for cutting grass sods from a grass land, the sod cutter comprising:
   a frame having a front end and a back end;
   a cutting head connected to the frame adjacent the front end thereof for cutting grass sods from a grass land;
   a sod support moveably connected to the frame adjacent the back end thereof;
   a conveyor connected to the frame, with the conveyor having a receiving end positioned to receive cut grass sods from the cutting head and a discharge end which extends toward the back end of the frame, with the discharge end of the conveyor moveable relative to the frame; and
   a conveyor head connected to the frame, with the conveyor head having a receiving end positioned to receive cut grass sods from the discharge end of the conveyor and a discharge end positioned over the sod support, with the conveyor head configured to transport to the sod support cut grass sods received at the receiving end thereof wherein the sod support and the discharge end of the conveyor are moveable transverse to each other.

26. A sod cutting apparatus for cutting grass sod from grass land, the sod cutting apparatus comprising:

a frame having a front end and a back end;

a cutting head connected to the frame adjacent the front end thereof for cutting grass sods from a grass land;

a sod receiving conveyor having a receiving end connected to the frame adjacent the cutting head for receiving the grass sods cut from the grass land and a discharge end which extends toward the back end of the frame;

an offset conveyor having a receiving end positioned adjacent the discharge end of the sod receiving conveyor and a discharge end which extends toward the back end of the frame; and a positioner connected between the frame and the sod receiving conveyor for moving the sod receiving conveyor between a first position where a first grass sod bypasses the offset conveyor during delivery of the first grass sod toward the back end of the frame for stacking and a second position where a second grass sod is delivered to the receiving end of the offset conveyor for delivery thereby toward the back end of the frame for stacking.

27. A sod cutter for cutting grass sods from a grass land, the sod cutter comprising:

a frame;

a cutting head connected to the frame adjacent one end thereof for cutting grass sods from a grass land;

a sod support connected to the frame adjacent the other end thereof;

a conveyor head connected to the frame adjacent the sod support; and a conveyor connected to the frame and configured to transport cut grass sods from the cutting head toward the conveyor head for transport thereby to the sod support, wherein the sod support and the conveyor head are at least one of horizontally and vertically relatively moveable during transport of cut grass sods to the sod support by the conveyor head.

\* \* \* \* \*